United States Patent [19]

Stritzke et al.

[11] Patent Number: 4,666,494

[45] Date of Patent: May 19, 1987

[54] METHOD OF PREPARING A SUCTION MOLD FOR RECEIVING VITRIFIED RADIOACTIVE WASTE MATERIALS AND APPARATUS THEREFOR

[75] Inventors: Detlef Stritzke, Mol; Eckhart Ewest, Balen, both of Belgium

[73] Assignee: Deutsche Gesellschaft für Wiederaufarbeitung von Kernbrennstoffen mbH, Hanover, Fed. Rep. of Germany

[21] Appl. No.: 794,628

[22] Filed: Nov. 4, 1985

[30] Foreign Application Priority Data

Nov. 3, 1984 [DE] Fed. Rep. of Germany ....... 3440260

[51] Int. Cl.[4] .......................... C03B 5/28; C03B 7/18; C09K 11/04

[52] U.S. Cl. .................................... 65/32; 29/455 R; 65/34; 65/124; 65/130; 65/329; 252/629; 252/633; 422/159; 425/546

[58] Field of Search ................. 65/17, 29, 32, 34, 134, 65/157, 124, 130, 181, 329; 252/629, 633; 422/159; 29/455 R; 249/98, 133, 141; 425/546

[56] References Cited

U.S. PATENT DOCUMENTS 4,115,311 9/1978 Sump .................................. 252/629

4,158,639 6/1979 Berty .................................. 252/629

4,199,343 4/1980 Eolin et al. .......................... 65/157

4,208,177 6/1980 Allen .............................. 425/546 X 4,234,449 11/1980 Wolson et al. ...................... 252/629

4,341,547 7/1982 Heimerl ............................ 65/124 X 4,582,674 4/1986 Stritzke .......................... 252/629 X

*Primary Examiner*—Robert Lindsay

*Attorney, Agent, or Firm*—Walter Ottesen

[57] ABSTRACT

Suction molds used in the suction removal process must first be prepared before they can receive vitrified radioactive waste materials. A method is disclosed for preparing the suction mold which includes a suction pipe welded into the base of the mold with a desired-break location whereat the suction pipe is broken off during the suction removal process. An evacuation stub is mounted in the mouth of the suction pipe and communicates with the interior of the mold. The method of the invention includes evacuating the mold through the evacuation stub and then heating the mold to remove moisture and organic impurities. The mold is then filled with a dry inert gas and the evacuation stub is cleaned. The mold is then evacuated to a predetermined residual pressure. Thereafter, the evacuation stub is cold-press welded so as to close off the interior of the mold from the ambient.

18 Claims, 4 Drawing Figures

METHOD OF PREPARING A SUCTION MOLD FOR RECEIVING VITRIFIED RADIOACTIVE WASTE MATERIALS AND APPARATUS THEREFOR

FIELD OF THE INVENTION

The invention relates to a method for preparing a suction mold for receiving vitrified radioactive waste materials in accordance with the suction removal method. An apparatus for performing the method is also disclosed.

BACKGROUND OF THE INVENTION

When irradiated nuclear reactor fuel elements are reprocessed, highly-active waste is obtained in the form of highly-active liquid concentrates of fission products. These liquid concentrates are solidified by appropriate vitrification processes. Glass-forming materials are added and the radioactive materials are melted to glass. The radioactive glass melt is placed in metal vessels made of special steel, so-called molds. After cooling, solidification and possibly quite long surface storage, it is intended that the glass-filled steel molds be taken to the ultimate storage location.

The vitrification of radioactive substances is advantageous for the reason that glass has a good resistance to leaching out. The chemical permanence of the storage package produced in this way is very high.

The melting of the glass-forming materials with the radioactive substances is usually carried out in a ceramic melting furnace directly heated by electricity. In the furnace the calcined fission product is continuously fused into the bath of glass melt. Metal vessels are then filled at intervals with the glass containing the radioactive substances.

Essentially three methods are known for filling the metal vessels from the glass melting furnace, namely: the bottom discharge system; the overflow system; and, the suction removal method.

In the suction removal method, prior to filling the steel mold, a partial vacuum is produced in the steel mold and the steel mold is then closed off so as to be vacuum tight. After a closed suction pipe, which is installed on the steel mold, is dipped into the molten glass bath from above, the partial vacuum in the steel mold causes the molten glass material to be drawn by suction into the closed steel mold after the closure on the suction pipe has melted. Therefore, in the technical language used in this art, the term "suction mold" has been adopted to denote a steel mold of this kind. In the descriptive passages which follow, the term "suction mold" is used for a metal container for receiving the molten glass material in accordance with the suction removal method.

In the suction removal method, a partial vacuum is established in the metal vessel and the vessel is sealed in a vacuum-tight manner. After a sealed suction tube mounted on the metal vessel dips into the glass melt from above and after the seal in the suction tube melts open, the partial vacuum in the metal vessel causes the glass melt to be drawn by suction into the closed metal vessel. The speed of filling the suction mold using the suction removal method is substantially higher than with the other mold filling methods.

The procedure of the suction removal method is disclosed in German published patent application DE-OS No. 29 27 795. In this process, the suction pipe which projects through a suction removal opening into the molten glass in the furnace is vacuum-tightly connected to the suction mold until the filling operation is concluded. Thereafter, the suction pipe is cut off and broken up and the broken pieces of the suction pipe are put into another empty container.

In relation to another procedure of the suction removal method disclosed in German Pat. No. 30 22 387, the suction pipe, which is fitted to the bottom of the suction mold to be filled, is pushed axially into the mold through an opening in the bottom thereof after the filling operation. The remaining opening in the suction mold is then closed by a container closure cover which is fitted into position thereon.

The essential part of the suction removal method, in terms of apparatus, namely the evacuated suction mold, is described in German published patent application DE-OS No. 31 04 366. The suction mold is provided with a suction pipe having a suction end which can be closed off by a fusible closure member. The closure member has a closable evacuation stub for evacuating the suction mold and the suction pipe. The evacuation stub is sealed in the closure part of the suction pipe and is arranged at least partially inside the suction pipe. The evacuation stub is made of a cold-weldable material which, for closing off the evacuation stub after the evacuation operation, is subjected to cold-press welding by mechanical deformation and thereby closed off. The cold welded metal connection of the evacuation stub provides a good vacuum-tight seal at the press-welded location.

After evacuation of the suction mold and prior to closing off the evacuation stub, a given residual gas pressure is set in the suction mold using dry gas.

SUMMARY OF THE INVENTION

It is an object of the invention to provide a method of preparing a suction mold for filling with vitrified radioactive waste materials by means of the suction removal process. It is a further object of the invention to provide such a method of preparing the suction mold which ensures that the suction molds are reliably and uniformly filled.

The method of the invention is for preparing a suction mold for receiving vitrified radioactive waste in accordance with the suction removal method. The suction mold has a base wall and a suction pipe welded at one end thereof into the base wall via a desired-break location whereat the suction pipe is broken from the base wall during the suction removal process. The suction pipe includes an easily meltable disc mounted in the mouth of the tube at the other end thereof and an evacuation stub fixedly mounted in the disc and communicating with the interior of the mold. The method includes the steps of evacuating the mold through the evacuation stub; heating the mold to remove moisture and organic contaminates; filling the mold with a dry inert gas to a pressure of at least atmospheric pressure; cleaning the inside of the evacuation stub; evacuating the mold to a predetermined residual pressure; and, cold-press welding the evacuation stub so as to seal the same while at the same time severing a portion of the stub and leaving a remainder portion mounted on the disc.

All organic contaminating material and moisture are driven out of the interior of the suction mold by heating the suction mold under vacuum over a given period of time at elevated temperatures.

By then subjecting the interior of the suction mold to a dry inert gas at a pressure of at least atmospheric pressure, the interior of the suction mold is protected from the ingress of moisture or impurities while the internal surface of the evacuation stub is cleaned. The operation of cleaning the interior of the evacuation stub results in the removal of condensed constituents which may possibly occur on the internal surface due to the heating operation. The operation of cleaning the evacuation stub further improves the quality of filling and also the integrity of the subsequent cold-press weld which is formed in a follow-on step.

After the cleaning operation, a vacuum source is again connected to the evacuation stub. There now follow the operations which are already known from the state of the art, namely: the step of evacuating; setting a predetermined residual gas pressure; and, cold-press welding the evacuation stub.

The step of setting a predetermined residual gas pressure in the suction mold affords the option of so controlling the degree of filling of the suction mold that after the filling step, there is still a free volume in the suction mold to permit insertion of the suction pipe therein.

According to another feature of the invention, the method includes the steps of charging the mold with gas at an overpressure for conducting a leakage test in advance of the first evacuation step; and, examining the mold at the outside thereof with gas sensors for traces of leaked gas. Thus, after the suction mold is delivered, a leakage test is carried out which is intended to establish the sealing tightness of the suction mold or the magnitude of the leakage rate. In this step, the suction mold is subjected to a test gas and increased pressure. It is now possible to check whether the test gas escapes. Any leakage of the suction mold can now be detected using gas sensors known per se and referred to as sniffers. These sensors are connected to leakage test equipment.

Pursuant to a further feature of the invention, the method can include the step of subjecting the mold to a leakage test after the step of heating the mold. The suction mold is again evacuated and a test gas is applied to the connecting locations of the mold. If leaks are present, the gas would reach the interior of the mold and can be detected with gas detectors.

The leakage test after the heating operation is carried out using helium. This inactive test gas can be detected even in very small traces by means of sensor technology which is already available.

Helium can be used for charging the mold after the heating step and the subsequent step of setting the predetermined residual gas pressure can also be conducted using helium.

According to still another feature of the invention, the method can include the step of charging the mold with a gas at an overpressure which is held for a predetermined period of time for conducting the leakage test. The step of subjecting the suction mold to the effect of gas, after the heating operation, and the subsequent operation of setting the predetermined residual gas pressure, are also carried out using helium.

The step of subjecting the suction mold to pressure, after the heating step, is advantageously linked to a leakage test. In this way, cracks which occur because of thermal stresses can be reliably discovered without a major effort.

According to still a further feature of the invention, a cold-press weld is also applied to the severed portion of the evacuation stub and the cold-press weld of the severed portion can be subjected to a leakage test to determine the integrity of the last-mentioned weld. Thus, after the step of squeezing and severing the evacuation stub, an indirect check of the gas tightness of the remaining portion of the evacuation stub can be performed.

It is another feature of the invention to clean the evacuating stub by a cutting operation. This eliminates a layer of oxide of the easily fusible material of which the evacuation stub is made. The quality of the subsequent cold-press welding operation is further enhanced.

After the step of cold-press welding the evacuating stub, the weld location of the evacuation stub may be coated with a solder. In this way, the V-shaped configuration of the weld receives a layer to protect it from mechanical influences.

The invention ensures that each suction mold which is treated in accordance with the invention is always reliably and rapidly filled. There is always an adequate reduced pressure present because the formation of vapor, which can occur as a consequence of impurities, is avoided in the filling operation. Leakage tests make it possible to detect suction molds which are not adequately sealed.

The invention also relates to an apparatus for performing the method of the invention. The apparatus and the method will be explained in detail with the drawings and in the disclosure which follow as well as in the appended claims.

BRIEF DESCRIPTION OF THE DRAWING

The invention will now be described with reference to the drawing wherein.

DESCRIPTION OF THE PREFERRED EMBODIMENTS OF THE INVENTION

Figure 1:
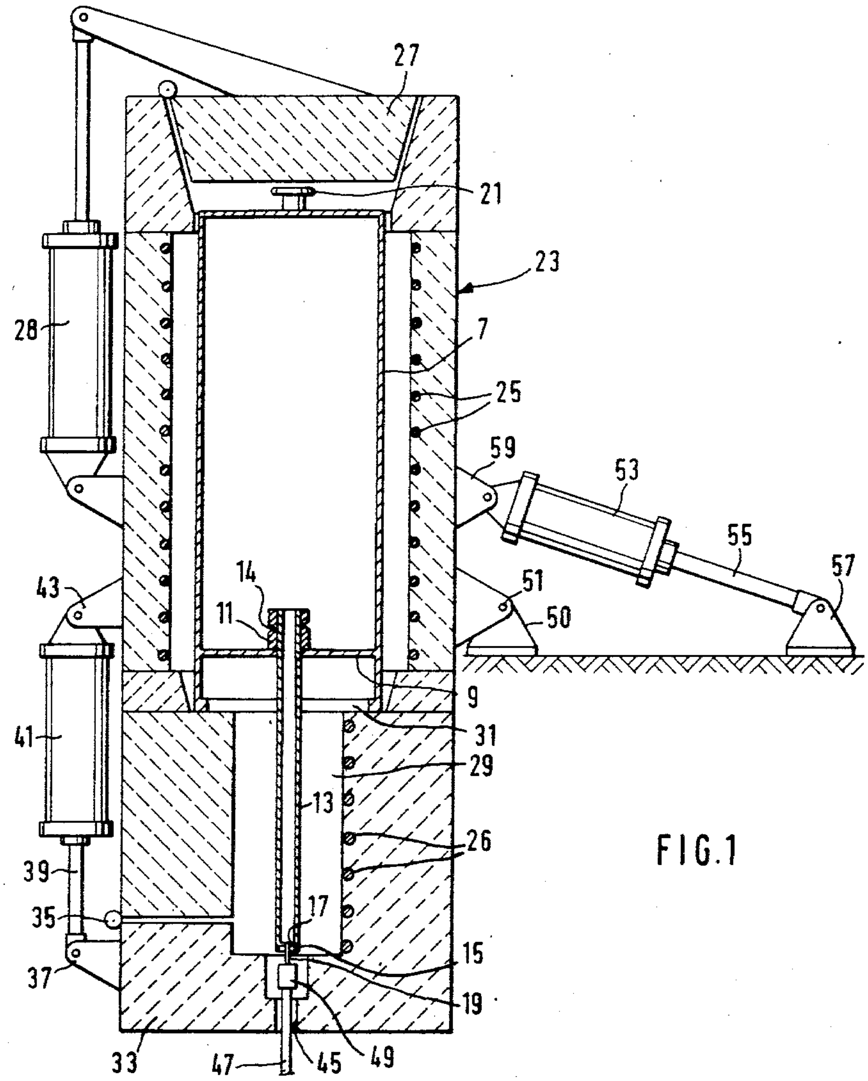
FIG. 1 is a side elevation view, partially in section, of a heating furnace in which a suction mold equipped with a suction pipe is disposed.

The suction molds 7 are prepared in a non-active processing chamber for use in a radioactively-loaded cell. The suction mold 7, as supplied (FIG. 1), has a weld-connected base 9 and a tubular guide stub 11 which is mounted centrally in a central bore in the base 9. The guide stub extends into the interior of the suction mold 7. One end of a suction pipe 13 is disposed in the guide stub 11 and is connected at that end to the guide stub 11 by means of a desired-break location 14. The suction pipe 13 projects beyond the suction mold 7 with almost its entire length.

Figure 2:
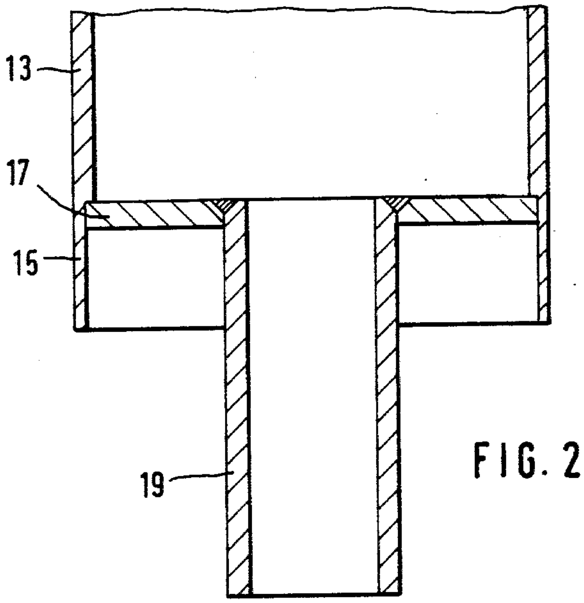
FIG. 2 is a detail section view of the end portion of the suction pipe of FIG. 1.
Figure 3:
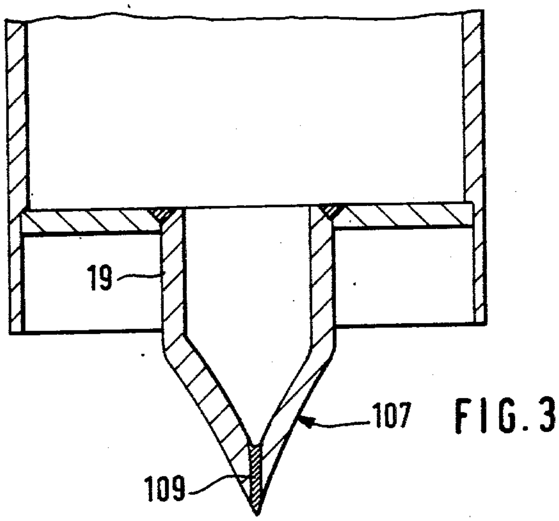
FIG. 3 shows the end portion of a suction pipe of FIG. 2 after performing the step of cold-press welding and severing the evacuation stub; and, FIG. 4 is a circuit diagram of an apparatus for carrying out the method according to the invention of preparing the suction mold.

A closure disc 17 having a central bore and made of a metal which is easily melted is soldered into the mouth 15 of suction pipe 13 (see FIG. 2). An evacuation stub 19 which is also made of easily meltable metal is soldered into the bore.

The suction mold 7 is introduced into a heating furnace 23 (FIG. 1) having electrical resistance heating means 25 and 26 by means of a suitable lifting tool which engages a handling lug 21 at the upper end wall of the suction mold 7. Then, the heating furnace is closed with a hinged insulating cover 27 by charging a double-acting hydraulic cylinder unit 28. The heating furnace is provided with a smaller internal chamber 29 in the region of the suction pipe 13 so that a projection 31 is formed on which the lower edge of the suction mold cylinder 7 can rest.

An end member 33 of the heating furnace 23 is arranged at the end of the heating furnace 23 in such a way that it can be pivoted open by means of a hinge 35 at a longitudinal side of the furnace. The openable end member 33 is pivotably connected via a mounting bracket 37 to a piston rod 39 of a double-acting pressure cylinder unit 41. The cylinder unit 41 is pivotably connected at its other end to a mounting bracket 43. The mounting bracket 43 is fixedly mounted on the main body of the heating furnace 23.

In the region of the openable end member 33, the heating furnace 23 has a small pass-through opening 45 through which passes a flexible conduit 47 which is secured to the evacuation stub 19 by means of a screw squeeze connector 49. The flexible conduit 47 makes the connection to a source of reduced pressure.

The heating furnace 23 is pivotable about a fixed pivot point 51, by means of a stationary mounting bracket 50. A further double-acting pressure-fluid cylinder unit 53 is provided for pivoting the heating furnace 23 about the pivot point 51; the piston rod 55 of the cylinder unit 53 is movably connected to a further stationary mounting bracket 57 and the cylinder housing is movably secured to the heating furnace 23 by means of a second mounting bracket 59.

Figure 4:
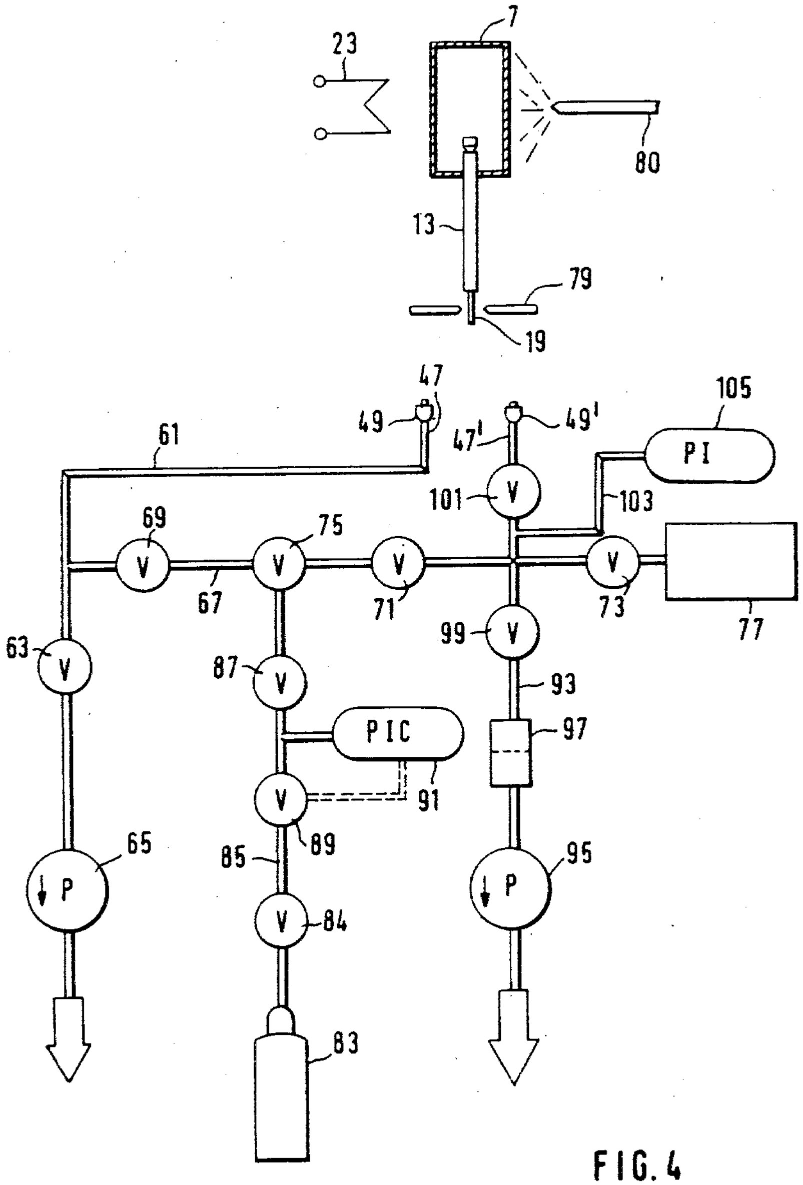

The apparatus for carrying out the method is shown schematically in FIG. 4 and includes the heating furnace 23 which is disposed horizontally during heating. The evacuation stub 19 is connectable to the hose 47 by means of a screw-squeeze connector 49 or to a parallel hose 47' which terminates in a further screw-squeeze connector 49'. The hose 47 is connected via a conduit 61 and a shut-off valve 63 to a vacuum pump 65 for pumping the coarse contaminates out of the suction mold 7. A conduit 67 is connected to conduit 61 and contains shut-off valves 69, 71 and 73 as well as a three-way valve 75. A helium leakage test apparatus 77 is mounted at the end of the conduit 67 and has its own integrated vacuum pump and displays the traces of helium on a display means. The helium leakage test apparatus 77 is commercially available and is produced, for example, by the companies Varian or Alcatel.

A hydraulically-actuated squeeze-tong arrangement 79 is mounted in the region of the evacuation stub 19 for cold-press welding and severing the evacuation stub 19.

A helium spray lance 80 is arranged in the region of the suction mold 7 and is connected to a helium pressure gas source (not shown) in a manner known per se.

A nitrogen bottle 83 is connected to the conduit 67 via a conduit 85 having a shut-off valve 84 via the three-way valve 75.

Provided in the conduit 85 are a fine regulating valve 87 for the quantitative gas flow and a pressure reducing valve 89 for reducing the bottle pressure. A pressure regulating means 91 for the pressure reducing valve 89 is connected between the pressure regulating valves 87 and 89. The pressure regulating means 91 determines the pressure setting of the valve 89 and keeps the pressure at a constant value.

The hose 47' is connected to a conduit 93 which leads to a fine vacuum pump 95 for the fine evacuation operation. A cooling trap 97 is arranged in the conduit 93 upstream of the pump 95 for freezing desorbed contaminates out of the gas flow. Two shut-off valves 99 and 101 are provided for shutting off the conduit 93. Between the shut-off valves 99 and 101, the conduit 93 has a branch 103 which leads to a pressure indicator device 105.

The method and apparatus will now be explained with an example.

The suction mold 7 which is subjected externally to preliminary testing to ensure that it is vacuum-tight is picked up by a works crane and set down from above into the furnace 23, the cover 27 of which was in the open position. After the cover 27 is closed, the heating furnace 23 is tilted through 90° into the horizontal position by actuating the hydraulic cylinder 53 thereby permitting easier manipulation.

By actuating the hydraulic cylinder unit 41 mounted on the lower pivotable member 33 of the furnace, the end member 33 is pivoted into the open position thereby making the evacuation stub 19 with the end of the suction pipe accessible. The flexible conduit 47 is connected to the evacuation stub 19 by means of the squeeze-screw connection 49. The valve 69 is closed and the valve 63 opened. The vacuum pump 65 is switched on and the suction mold 7 is heated to a temperature of 400° C. by the electrical heating means 23 and held at that temperature for 3 hours. The diameter of the suction mold 7 is 300 mm while its length is 1200 mm.

During the heating time, impurities such as organic constituents, water and absorbed gases undergo desorption from the inside surface of the suction mold 7 and are pumped away by means of the vacuum pump 65. The shut-off valve 63 is then closed and the vacuum pump 65 switched off.

The shut-off valve 84 ahead of the nitrogen bottle 83 is opened and a constant initial pressure which is somewhat higher than atmospheric pressure is set by the pressure reducing valve 89.

The quantitative flow rate of the nitrogen is restricted by the fine regulating valve 87. The three-way valve 75 is switched into such a position that valve 87 and the shut-off valve 69 are connected to each other. The shut-off valve 69 is then opened and the suction mold 7 is filled with nitrogen to atmospheric pressure.

The connection 49 is now removed and the inside wall surface of the evacuation stub 19 is cleaned by reaming the same out with a reamer. The evacuation stub 19 is then connected to the second connection 49'. The shut-off valve 71 is closed, the shut-valve 101 is opened, the shut-off valve 73 is closed and the shut-off valve 99 is opened. The fine vacuum pump 95 is switched on and, when a pressure of less than 10 millibars is reached, the cooling trap 97 is filled with liquid nitrogen. When the pressure in the suction mold 7 is less than $10^{-2}$ millibars, the shut-off valve 99 is closed and the communication with the helium leakage tester 77 is made by opening the shut-off valve 73.

The suction mold 7 is now tested for leaks by carefully spraying it with helium through a helium spray lance 80, the leaks being displayed in quantitative terms in the helium leakage tester 77. If the suction mold 7 is sufficiently tight, the shut-off valve 73 is closed. By opening the shut-off valve 71 and switching the three-way valve 75, a given residual gas pressure is produced with nitrogen in the suction mold 7; the residual gas pressure is determined by adjusting the fine regulating valve 87 and is displayed by way of the pressure indicator device 105. The pressure depends on the desired degree of filling of the suction mold 7 with glass. There must still be a free volume within the suction mold 7 available for inserting the suction pipe 13.

When the predetermined residual gas pressure is attained, the shut-off valve 71 and the fine regulating valve 87 are closed.

Then, by actuation of the hydraulic squeeze tongs 79, the evacuation connection 19 is compressed until it is severed below a cold press weld thereby providing a vacuum-tight closure with respect to the suction mold 7.

The severed ends of the evacuation connection 19 are equally wedge-shaped and have identical qualitative properties with respect to their weld locations. The severed ends therefore represent twin pieces. The part of the evacuation stub 19 which remains on the connection 49 can thus be used for a separate leakage test. In this operation, the shut-off valve 73 is opened and helium is sprayed via the helium spray lance 80 on to the weld location of the severed portion of the evacuation stub. Reference can now be made to the helium leakage test apparatus 77 to find out whether the weld location of that portion is sufficiently sealed. If that leakage test is negative, that is to say, the weld location of the severed portion is sufficiently vacuum-tight, it can be concluded that the twin piece 107 which remains on the suction mold 7 is vacuum-tight. This provides an advantageous indirect check on the tightness of the weld location 109 of the evacuation stub 19.

The lower pivotable portion 33 of the heating furnace 23 is now closed again. The furnace 23 is pivoted into the vertical position. The closure cover member 27 is opened and the mold 7 is removed by means of a suitable lifting apparatus. The mold 7 is now ready for filling by means of the suction removal method.

It is understood that the foregoing description is that of the preferred embodiments of the invention and that various changes and modifications may be made thereto without departing from the spirit and scope of the invention as defined in the appended claims.

What is claimed is:

1. Method for preparing a suction mold for receiving vitrified radioactive waste in accordance with the suction removal method, the suction mold having a base wall and a suction pipe welded at one end thereof into said base wall via a desired-break location, the suction pipe including an easily meltable disc mounted in the mouth of the tube at the other end thereof and an evacuation stub fixedly mounted in said disc and communicating with the interior of said mold, the method comprising the steps of:

- evacuating the mold through said evacuation stub;
- heating the mold to remove moisture and organic contaminates;
- filling the mold with a dry inert gas to a pressure of at least atmospheric pressure;
- cleaning the inside of said evacuation stub;
- evacuating said mold to a predetermined residual pressure; and,
- cold-press welding said evacuation stub so as to seal the same while at the same time severing a portion of said stub and leaving a remainder portion mounted on said disc.

2. The method of claim 1, comprising the steps of charging said mold with gas at an overpressure for conducting a leakage test in advance of said first evacuation step; and, examining said mold at the outside thereof with gas sensors for traces of leakage gas.

3. The method of claim 1, comprising the step of subjecting said mold to a leakage test after said step of heating said mold.

4. The method of claim 3, wherein said leakage test is conducted with said mold evacuated and with a test gas applied to the connecting locations of said mold.

5. The method of claim 4, wherein said test is conducted with helium and in the event of a leak, the helium is guided to sensors.

6. The method of claim 1, wherein said dry inert gas is helium and wherein said residual gas pressure is adjusted with helium.

7. The method of claim 3, comprising the step of charging said mold with a gas at an overpressure which is held for a predetermined period of time for conducting said leakage test.

8. The method of claim 1, wherein a cold-press weld is also applied to the severed portion of said evacuation stub, the method further comprising the step of subjecting the cold-press weld of said severed portion of said evacuation stub to a leakage test to determine the integrity of said last-mentioned weld.

9. The method of claim 1, wherein said evacuating stub is cleaned by a cutting operation.

10. The method of claim 1, comprising the further step of coating said remainder portion of said stub with soldering means after severing the same.

11. Apparatus for preparing a suction mold for receiving vitrified radioactive waste in accordance with the suction removal method, the suction mold having a base wall and a suction pipe welded at one end thereof into said base wall via a desired-break location, the suction pipe including an easily meltable disc mounted in the mouth of the tube at the other end thereof and an evacuation stub fixedly mounted in said disc and communicating with the interior of said mold, the apparatus comprising:

- a furnace for receiving and heating said suction mold;
- vacuum pump means for developing a vacuum in said mold;
- first conduit means for communicating said pump means with said mold and including a shut-off valve;
- a releasable connector for connecting said first conduit means to said stub;
- inert gas source means for supplying inert gas to fill said mold; and,
- second conduit means for conducting the inert gas to said mold and including pressure-regulating valves and shut-off valve means for connecting said inert gas source means with said releasable connector.

12. The apparatus of claim 11 comprising:

- second vacuum pump means for developing a vacuum in said mold;
- third conduit means for communicating said second vacuum pump means with said mold and including shut-off valve means;
- a second releasable connector for connecting said third conduit means to said stub.

13. The apparatus of claim 12, said first conduit means and said second conduit means having respective flexible segments connected to said first-mentioned releasable connector and said second releasable connector.

14. The apparatus of claim 12, comprising a cooling trap connected ahead of said second vacuum pump means.

15. The apparatus of claim 12, comprising a helium leakage test device having an integrated vacuum pump and being adapted so as to be connectable to at least one of said first-mentioned releasable connector and said second releasable connector.

16. The apparatus of claim 11, said furnace having a top opening for receiving said mold from above and a cover for closing said opening.

17. The apparatus of claim 16, comprising stationary pivot means for pivoting said furnace.

18. The apparatus of claim 16, said furnace having a chamber formed in the lower end portion thereof for accommodating said suction pipe with said evacuation stub therein, said furnace further having a pivotally mounted closure for making said evacuation stub accessible from outside of said furnace.

* * * * *